(12) United States Patent  
Gupta et al.

(10) Patent No.: US 10,305,314 B2  
(45) Date of Patent: May 28, 2019

(54) SYSTEM AND METHOD OF WIRELESSLY CHARGING DEVICES

(71) Applicant: Dell Products L.P., Round Rock, TX (US)

(72) Inventors: Chitrak Gupta, Bangalore (IN); Mainak Roy, Kolkata (IN); Rathi Babu, Bangalore (IN); Aeiswarjya Pattnaik, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 40 days.

(21) Appl. No.: 15/612,526

(22) Filed: Jun. 2, 2017

(65) Prior Publication Data

US 2018/0351387 A1 Dec. 6, 2018

(51) Int. Cl.
- *H02J 7/02* (2016.01)
- *H02J 7/04* (2006.01)
- *H04B 5/00* (2006.01)

(52) U.S. Cl.
CPC .......... *H02J 7/025* (2013.01); *H02J 7/045* (2013.01); *H04B 5/0031* (2013.01); *H04B 5/0037* (2013.01)

(58) Field of Classification Search
CPC ........ H02J 7/025; H02J 7/045; H04B 5/0031; H04B 5/0037
USPC ........................................................ 320/108
See application file for complete search history.

(56) References Cited

U.S. PATENT DOCUMENTS

| | | | |
|---|---|---|---|
| 9,921,726 B1 * | 3/2018 | Sculley | .................... H04W 4/04 |
| 2015/0084584 A1 | 3/2015 | Monks et al. | |
| 2015/0091510 A1 | 4/2015 | Iwawaki et al. | |

OTHER PUBLICATIONS

Wireless Power Consortium, "The Qi Wireless Power Transfer System Power Class 0 Specification", Parts 1 and 2: Interface Definitions, Version 1.2.2, 160 pages, Apr. 2016.
Wireless Power Consortium, "The Qi Wireless Power Transfer System Power Class 0 Specification", Part 4: Reference Designs, Version 1.2.2, 309 pages, Apr. 2016.
Bill Johns "An introduction to the Wireless Power Consortium standard and TI's compliant solutions" Power Management, Texas Instruments Incorporated analop Applications Journal, 2011, 5 pages.

(Continued)

*Primary Examiner* — M Baye Diao
(74) *Attorney, Agent, or Firm* — Baker Botts L.L.P.

(57) ABSTRACT

In one or more embodiments, one or more systems, methods, and/or processes may supply, via wireless charging endpoints, more power to a first device of multiple devices than to a second device of the multiple devices. While the multiple devices are wirelessly coupled to the wireless charging endpoints, current data, from each of the multiple devices may be received. If historical data of each of the multiple devices is available via a storage medium: the current data may be compared with the most recently stored historical data, and based on comparing the current data with the most recently stored historical data, more power may be supplied to another device of the multiple devices than to at least one of the first device and the second device. If the historical data is not available, the current data may be stored, via the storage medium, as the most recent historical data.

20 Claims, 8 Drawing Sheets

(56) References Cited

OTHER PUBLICATIONS

Panasonic "Integrated Wireless Power Supply Receiver, Qi (Wireless Power Consortium) Compliant" AN32258A Ver.2.00, Oct. 22, 2014 31 pages.
Dario Borghino, "New wireless power tech can charge multiple devices in any orientation", at <http://newatlas.com/new-wireless-power-tech-can-charge-multiple-devices-at-once-at-a-distance/38361/>, 27 pages, Jul. 10, 2015.
"Bq51003 Highly Integrated Wireless Receiver Qi (WPC v1.1) Compliant Power Supply" Texas Instruments, SLUSBC8A Dec. 2013, Revised Jun. 2016, 39 pages.
Xiang Gao, "Demodulating Communication Signals of Qi-Compliant Low-Power Wireless Charger Using MC56F8006 DSC" Freescale Semiconductor, Document No. AN4701, Rev. 0, Mar. 2013.
P. Manivannan et al., "Qi Open Wireless Charging Standard—A Wireless Technology for the Future" International Journal of Engineering and Computer Science ISSN:2319-7242, vol. 2 Issue 3, Mar. 2013, pp. 573-579.
Power by Proxi, Proxi-3D In-Device Charging System at <https://powerbyproxi.com/proxi-labs/proxi-3d-in-device-charging-system/>, Printed Jun. 2, 2017.

* cited by examiner

SYSTEM AND METHOD OF WIRELESSLY CHARGING DEVICES

BACKGROUND

Field of the Disclosure

This disclosure relates generally to information handling systems and more particularly to charging devices.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Moreover, mobile devices continue to gain popularity. Some of these devices can include cellular telephones, smart phones, tablets, laptops, and new smart accessories such as glasses and wrist-worn devices, among others. In the past, a wireless charging socket could not determine which device required charge at a given point. There was no physical device to support multiple devices based on present charging statuses. Moreover, limitations and chargers dedicated to one system cannot charge other components, for instance.

SUMMARY

In one or more embodiments, one or more systems, methods, and/or processes may supply, via wireless charging endpoints, more power to a first device of multiple devices than to a second device of the multiple devices. For example, the multiple devices may include at least one of a wireless telephone, a tablet computing device, a laptop computing device, a rechargeable battery, a wireless battery charger, a wireless keyboard, and a wireless pointing device. While the multiple devices are wirelessly coupled to the wireless charging endpoints, one or more systems, methods, and/or processes may receive current data, from each of the multiple devices, that includes a current charge capacity of each of the multiple devices and a current discharge rate of each of the multiple devices and may determine if historical data of each of the multiple devices is available via a storage medium. In one example, the current data, from each of the multiple devices, may further include a current cut-off voltage of each of the multiple devices and a current charge voltage of each of the multiple devices. In another example, the current data may be received via at least one of a Qi protocol and a Bluetooth protocol.

In one or more embodiments, if the historical data of each of the multiple devices is available via the storage medium: most recently stored historical data, from the storage medium, that includes a most recently stored charge capacity of each of the multiple devices and a most recently stored discharge rate of each of the multiple devices may be received; the current data may be compared with the most recently stored historical data; and based on comparing the current data with the most recently stored historical data, more power may be supplied to another device of the multiple devices than to at least one of the first device and the second device. If the historical data, from each of the multiple devices, is not available via the storage medium: more power may be continued to be supplied to the first device than to the second device via the wireless charging endpoints, and the current data may be stored, via the storage medium, as the most recent historical data. In one or more embodiments, the other device may be the second device, and when more power is supplied to the other device than to the at least one of the first device and the second device, more power is supplied to the second device than to the first device.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a reference numeral followed by a letter refers to a specific instance of an element and the numeral only form of the reference numeral refers to the collective element. Thus, for example, device '12A' refers to an instance of a device class, which may be referred to collectively as devices '12 ' and any one of which may be referred to generically as a device '12'.

In one or more embodiments, a distributed charging system may include wireless charging end points that charge devices. For example, the distributed charging system may include a control unit that controls how much and/or when power is distributed to the devices via the wireless charging end points. For instance, the wireless charging end points may be coupled to a wireless charging hub that may include the control unit. In one or more embodiments, the control unit may receive data from the devices via the wireless charging end points and may determine how much and/or when power can be simultaneously distributed to each of two or more of the devices via the wireless charging end points based on the data received. For example, the data from the devices may include one or more of a current charge capacity of each of one or more of the devices, a current discharge rate of each of one or more of the devices, a cut-off voltage of each of one or more of the devices, and a charge voltage of each of one or more of the devices, among others.

In one or more embodiments, differing power levels may be provided to the devices at different times. In one example, the control unit may determine that a device attained an optimal charge level, and the control unit device may no longer provide power to the device. For instance, the control unit may disconnect a charging bridge associated with the device. In another example, based on a discharge rate and other parameters of one or more devices may, the control unit may provide power to the one or more devices, while providing less power to other one or more devices or not providing power to the other one or more devices.

In one or more embodiments, the control unit may continually receive data from the devices, determine one or more power preferences and/or requirements of the devices, and provide differing power levels based on one or more of power availability, power deliverability, and the one or more power preferences and/or requirements of the devices, among others. In one example, a finite amount of power may be available to the wireless charging hub. In a second example, a finite amount of power may be distributed to a wireless charging end point. In a third example, a finite amount of power may be distributed to a device due to a thermal threshold. For instance, if the thermal threshold is exceeded, one or more of the device and a person may be harmed.

In one or more embodiments, a user interface (e.g., a graphical user interface) may assist one or more users with charging devices and their respective charging requirements. For example, the user interface may provide real-time information about one or more of devices coupled to the wireless charging hub. For instance, the user interface may include a touch screen. In one or more embodiments, the wireless charging hub may receive information associated with the devices and determine power distribution to the devices, based on the received information. For example, power distribution and amounts of time for the power distribution may vary. In one instance, the wireless charging hub may provide information associated with the varying power distribution and amounts of time for the power distribution via the user interface. In another instance, the wireless charging hub may receive information via the user interface (e.g., a request for 1004 charge of a device, etc.).

Figure 1:
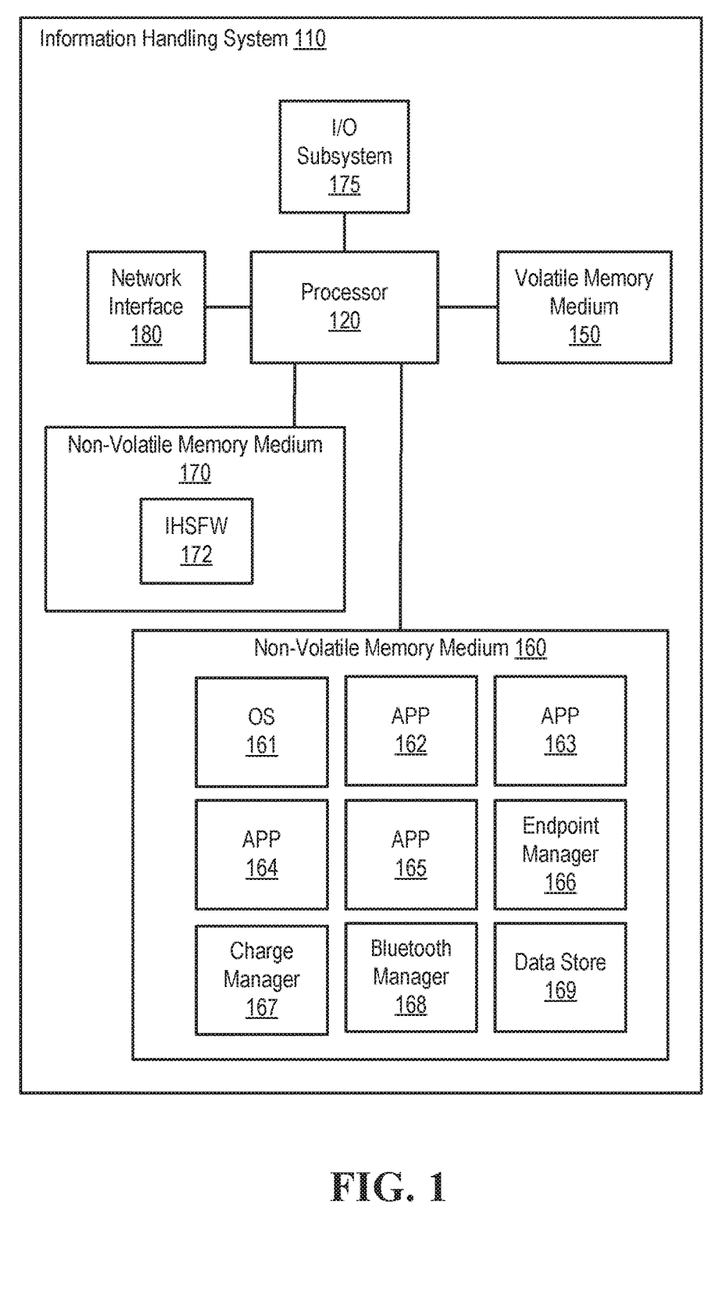
FIG. 1 illustrates an exemplary information handling system, according to one or more embodiments.

Turning now to FIG. 1, an exemplary information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a wireless charging hub, a mobile device, a personal digital assistant (PDA), a consumer electronic device, an electronic music player, an electronic camera, an electronic video player, a network storage device, or another suitable device and may vary in size, shape, performance, functionality, and price. In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, Hyper-Transport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SM-Bus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, term "memory medium" may mean a "storage device", a "memory", a "memory device", "tangible computer readable storage medium", and/ or "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAIVI (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 161, applications (APPs) 161-165, an endpoint manager 166, a charge manager 167, a Bluetooth manager 168, and a data store 169. In one or more embodiments, one or more of OS 161, APPs 162-165, endpoint manager 166, charge manager 167, and Bluetooth manager 168 may include instructions executable by processor 120 that may be utilized in implementing one or more flowcharts illustrated and/or one or more processes, methods, and systems described herein. In one example, processor 120 may execute processor instructions of one or more of OS 161, APPs 162-165, endpoint manager 166, charge manager 167, and Bluetooth manager 168 via non-volatile memory medium 160. In another example, one or more portions of the processor instructions of the one or more of OS 161, APPs 162-165, endpoint manager 166, charge manager 167, and Bluetooth manager 168 may be transferred to volatile memory medium 150, and processor 120 may execute the one or more portions of the processor instructions of the one or more of OS 161, APPs 162-165, endpoint manager 166, charge manager 167, and Bluetooth manager 168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2:
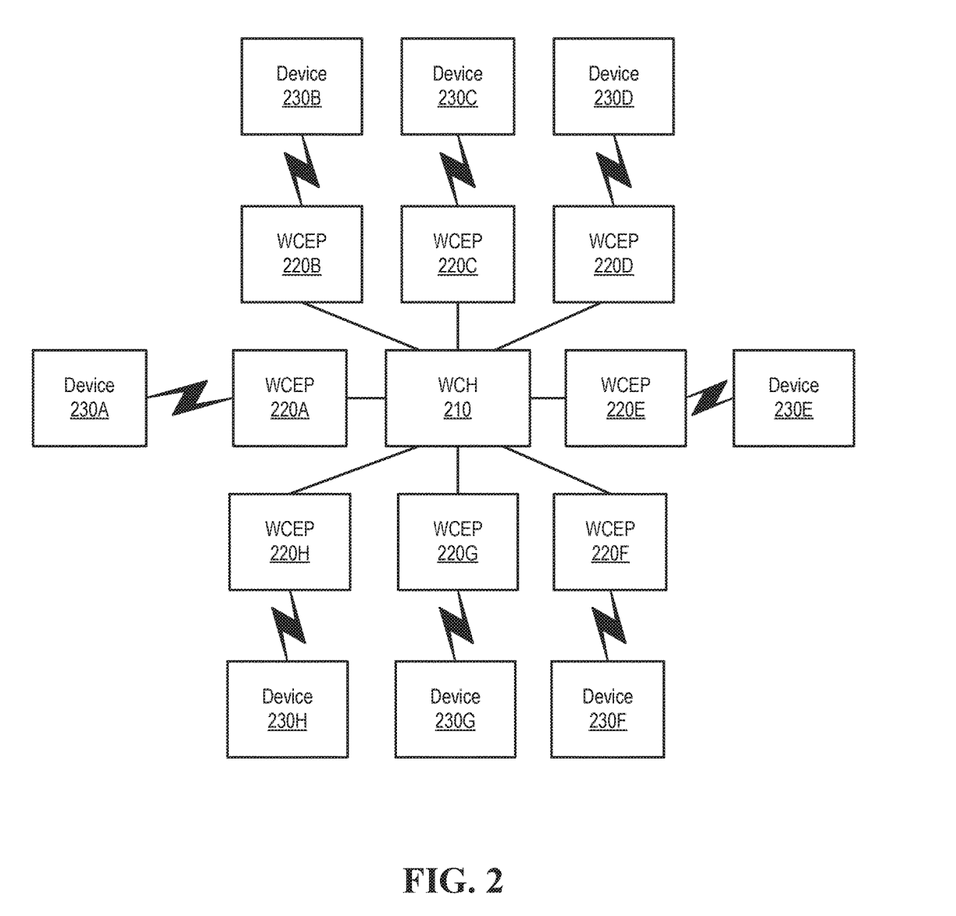
FIG. 2 illustrates, an exemplary wireless charging system, according to one or more embodiments.

Turning now to FIG. 2, an exemplary wireless charging system is illustrated, according to one or more embodiments. As shown, a wireless charging hub (WCH) 210 may be coupled to wireless charging endpoints (WCEPs) 220A-220H. In one example, WCEPs 220A-220H may be separate. In a second example, two or more of WCEPs 220A-220H may be combined. For instance, two or more of WCEPs 220A-220H may be combined into a wireless charging mat. In a second example, two or more of WCEPs 220A-220H may be combined with WCH 210. For instance, two or more of WCEPs 220A-220H may be combined with WCH 210, which may be combined into a wireless charging mat. In another example, two or more of WCEPs 220A-220H may be included in a wireless charging array.

As illustrated, WCEPs 220A-220H may wirelessly charge respective devices 230A-230H. In one or more embodiments, WCH 210 may include one or more structures and/or functionalities described and/or illustrated with reference to IHS 110. In one or more embodiments, the wireless charging system may include one or more of WCH 210 and one or more WCEPs 220A-220H, among others.

Figure 3:
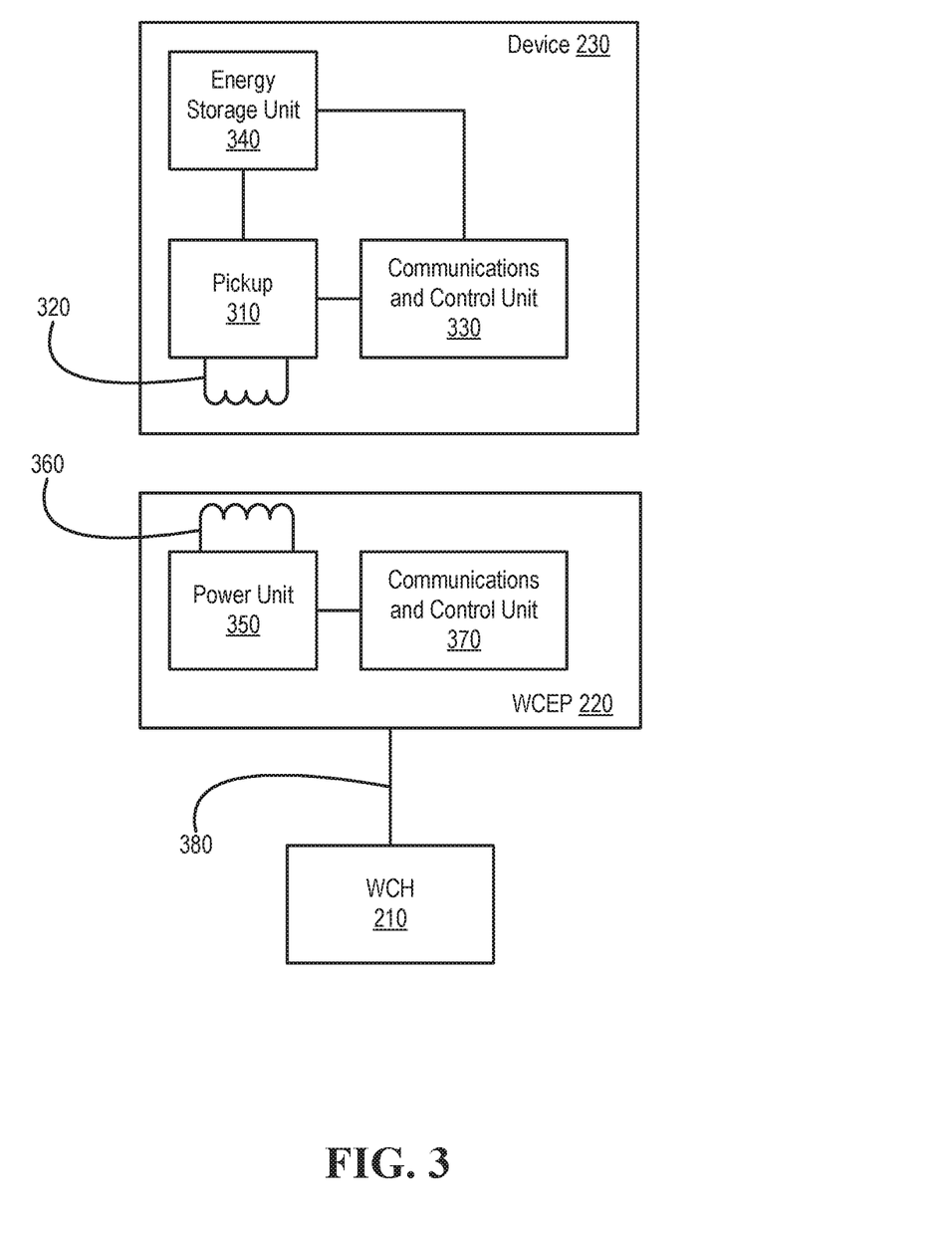
FIG. 3 illustrates an exemplary wireless charging hub and a device, according to one or more embodiments.

Turning now to FIG. 3, an exemplary wireless charging hub and a device are illustrated, according to one or more embodiments. As shown, device 230 may include a pickup 310, a coil 320, a communications and control unit 330, and an energy storage unit 340. As illustrated, pickup 310 may be coupled to coil 320, communications unit and control 330, and energy storage unit 340. In one or more embodiments, coil 320 may capture and/or receive one or more magnetic fields. For example, coil 320 may provide voltage and current from the one or more magnetic fields to pickup 310. In one or more embodiments, pickup 310 may provide regulated voltage and/or current to energy storage unit 340. For example, energy storage unit 340 may be or may include one or more of a rechargeable battery and a capacitor, among others. In one instance, the rechargeable battery may store energy via chemical energy. In another instance, the capacitor may store energy via an electric field.

In one or more embodiments, communications unit and control 330 may regulate energy transfers to energy storage unit 340. In one example, communications unit and control 330 may limit an amount of energy transferred to energy storage unit 340. In another example, communications unit and control 330 may request energy be transferred to device 230.

As illustrated, wireless charging end point (WCEP) 220 may include a power unit 350, a coil 360, and a communications unit and control 370. In one or more embodiments, coil 360 may include multiple coils. As shown, power unit 350 may be coupled to coil 360 and communications unit and control 370. As illustrated WCEP 220 may be coupled to WCH 210 via a coupling 380. In one or more embodiments, coupling 380 may be utilized in transferring communications between WCEP 220 and in transferring power to WCEP 220. In one example, coupling 380 may be utilized in transferring power to power unit 350, although not specifically illustrated. In another example, coupling 380 may be utilized in transferring communications between WCH 210 and communications unit and control 370, although not specifically illustrated.

In one or more embodiments, WCH 210 may have a finite amount of power to supply to multiple devices 230. For example, differing amounts of power may be supplied to differing devices 230. For instance, first one or more of devices 230 may receive a first amount of power, and second one or more devices 230 may receive a second amount of power, different from the first amount of power. In one or more embodiments, WCH 210 may supply a finite amount of power to supply to multiple devices 230.

Figure 4:
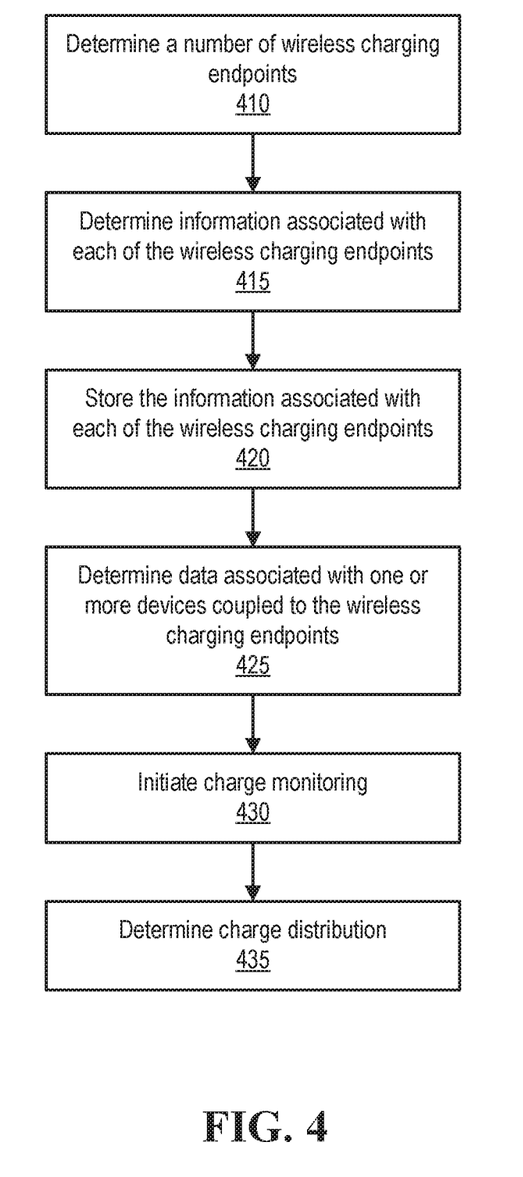
FIG. 4 illustrates an exemplary method of operating a wireless charging hub, according to one or more embodiments.

Turning now to FIG. 4, an exemplary method of operating a wireless charging hub is illustrated, according to one or more embodiments. At 410, a number of wireless charging endpoints may be determined. For example, WCH 210 may determine a number of WCEPs 220 coupled to it. At 415, information associated with each of the wireless charging endpoints may be determined. For example, WCH 210 may determine information associated with each WCEP 220 coupled to it.

At 420, the information associated with each of the wireless charging endpoints may be stored. For example, WCH 210 may store the information associated with each of the wireless charging endpoints 220. For instance, WCH 210 may store the information associated with each of the wireless charging endpoints 220 via a memory medium. At 425, data associated with one or more devices coupled to the wireless charging endpoints may be determined. For example, WCH 210 may determine data associated with one or more devices 230 coupled to WCEPs 220.

At 430, charge monitoring may be initiated. For example, WCH 210 may initiate charge monitoring. For instance, WCH 210 may initiate charge monitoring of the one or more devices 230 coupled to WCEPs 220. At 435, charge distribution may be determined. For example, WCH 210 may determine charge distribution. For instance, WCH 210 may determine charge distribution for the one or more devices 230 coupled to WCEPs 220. In one or more embodiments, determining charge distribution may include determining one or more of a voltage, an amperage, and an amount of time each for the one or more devices coupled to the wireless charging endpoints.

Figure 5:
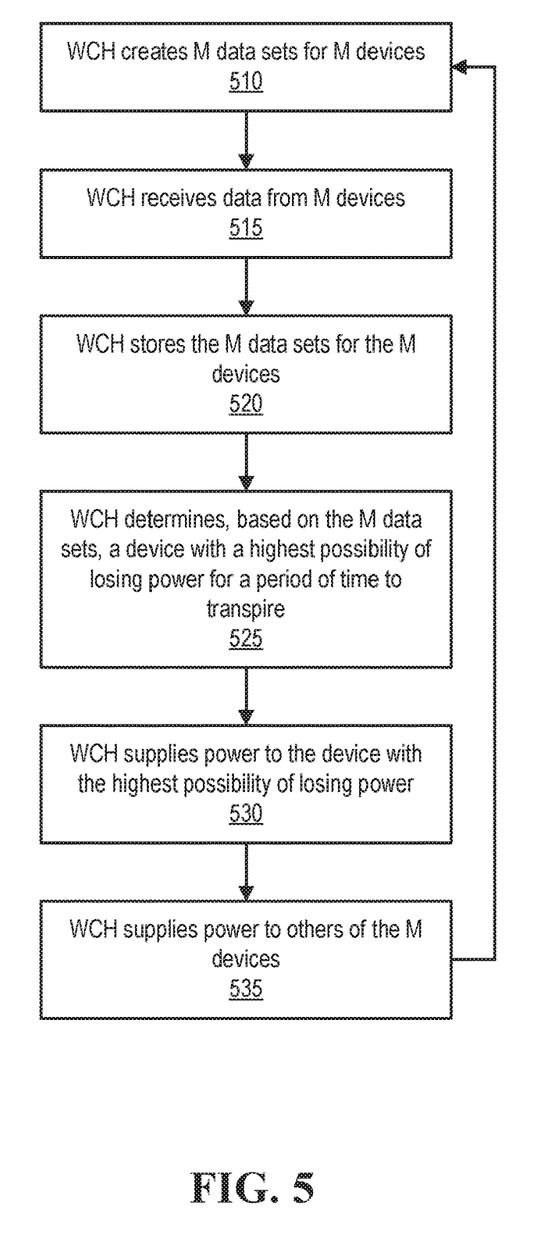
FIG. 5 illustrates an exemplary method of charging devices via a wireless charging hub, according to one or more embodiments.

Turning now to FIG. 5, an exemplary method of charging devices via a wireless charging hub is illustrated, according to one or more embodiments. At 510, WCH 210 may create M data sets for M devices. For example, the M devices 230 may be wirelessly coupled to respective WCEPs 220. In one instance, M may be a number of WCEPs 220. In another instance, M may be less than the number of WCEPs 220. In one or more embodiments, each of the M data sets may include a charge percentage, a discharge rate value, a cutoff voltage value, and a charge voltage value, among others.

At 515, WCH 210 may receive data from the M devices. In one example, WCH 210 may receive data from the M devices via a Qi protocol. For instance, endpoint manager 166 may receive the data from the M devices via a Qi protocol. In another example, WCH 210 may receive data from the M devices via a Bluetooth protocol. For instance, Bluetooth manager 168 may receive the data from the M devices via the Bluetooth protocol. In one or more embodiments, the data from the M devices may include information that may be utilized in determining the device of the M devices with the highest possibility of losing power and/or one or more results of Peukert's equation.

At 520, WCH 210 may store the M data sets. For example, WCH 210 may store the M data sets via one or more of memory media 150 and 160. For instance, WCH 210 may store the M data sets via data store 169. In one or more embodiments, storing the M data sets may include providing the M data sets to an IHS via a network. For example, the IHS may store the M data sets. At 525, WCH 210 may determine, based on the M data sets, a device of the M devices with a highest possibility of losing power. For example, the device with the highest possibility of losing power may be a device that has a shortest amount of time until the device loses power. In one or more embodiments, determining the device of the M devices with the highest possibility of losing power may include utilizing Peukert's equation, $$T = \frac{C}{I^n},$$

where T is hours, C is a Peukert capacity of a battery, I is a discharge current, and n is Peukert's exponent (e.g., n=1.25). A modification of Peukert's equation, for example, may include $$T = \frac{R\left(\frac{C}{R}\right)^n}{I^n},$$

where R is an hour rating (e.g, twenty hours, ten hours, etc.). Another modification of Peukert's equation, in another example, may include $$T = \frac{R\left(\frac{C}{R}\right)^{n-1}}{I^n}.$$

At 530, WCH 210 may supply power to the device with the highest possibility of losing power. For example, charge manager 167 may be utilized in supplying power to the device with the highest possibility of losing power. At 535, WCH 210 may supply power to others of the M devices. For example, WCH 210 may supply power, in a simultaneous fashion, to others of the M devices. For instance, charge manager 167 may be utilized in supplying power, in a simultaneous fashion, to others of the M devices.

In one or more embodiments, WCH 210 may supply power to a portion of the M devices. For example, WCH 210 may supply power to the highest possibility of losing power and one or more of the M devices, but supply power to less than M devices of the M devices. In one or more embodiments, the method may proceed to 510. In one example, one or more other devices may be added to the M devices. In a second example, one or more other devices may be removed from the M devices. In a third example, one or more devices that are not being charged may continue to have diminishing charges. In another example, one or more device attributes (e.g., a charge percentage, a discharge rate value, a cutoff voltage value, and a charge voltage value, etc.) may change.

Figure 6:
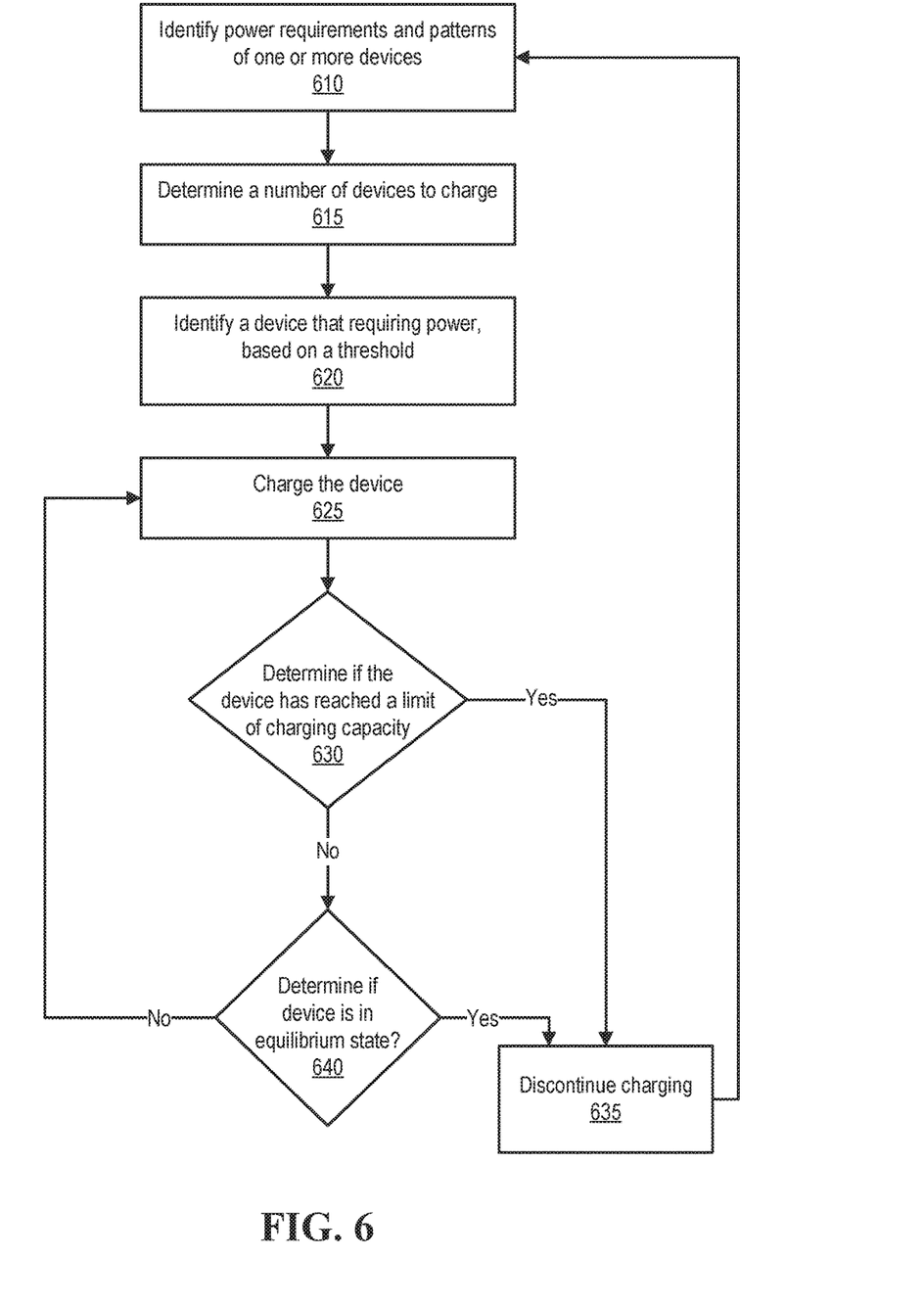
FIG. 6 illustrates an exemplary method of charging devices, according to one or more embodiments.

Turning now to FIG. 6, an exemplary method of charging devices is illustrated, according to one or more embodiments. At 610, power requirements and patterns of one or more devices may be identified. For example, power requirements and patters of one or more of devices 230A-230H may be identified. For instance, WCH 210 may retrieve data from data store 169 to identify one or more patterns of one or more devices of devices 230A-230H. At 615, a number of devices to charge may be determined. For example, WCH 210 may determine a number of devices coupled to WCEPs 220. For instance, at least a portion of the devices coupled to WCEPs 220 may require power.

In one or more embodiments, method elements 620-635 may be performed for each of the devices. At 620, a device requiring power, based on a threshold, may be identified. At 625, the device requiring power may be charged. At 630, it may be determined if the device has reached a limit of charging capacity. If the device has reached the limit of charging capacity, charging of the device may be discontinued at 635. For example, discontinuing charging of the device may include discontinuing supplying power to the device. In one or more embodiments, the method may proceed to 610.

If the device has not reached the limit of charging capacity, it may be determined if the device is in an equilibrium state at 640. In one or more embodiments, an equilibrium state of device 230 may include device 230 being at a minimum charge level. If the device is in the equilibrium state, charging may be discontinued at 635. In one or more embodiments, the method may proceed to 610. If the device is not in the equilibrium state, the device may be charged at 625.

Figure 7A:
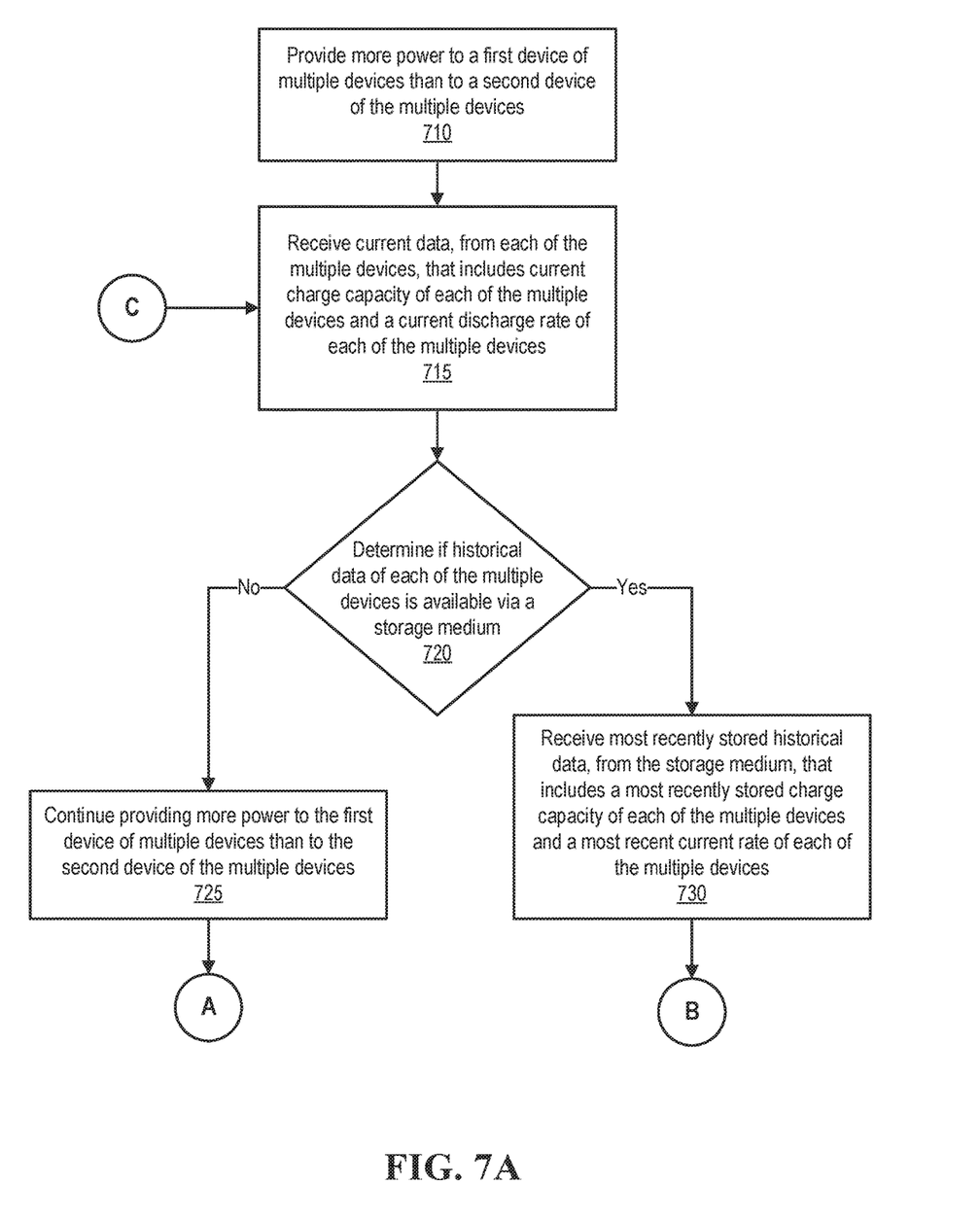
FIGS. 7A and 7B illustrates an exemplary method of operating a wireless charging system, according to one or more embodiments.
Figure 7B:
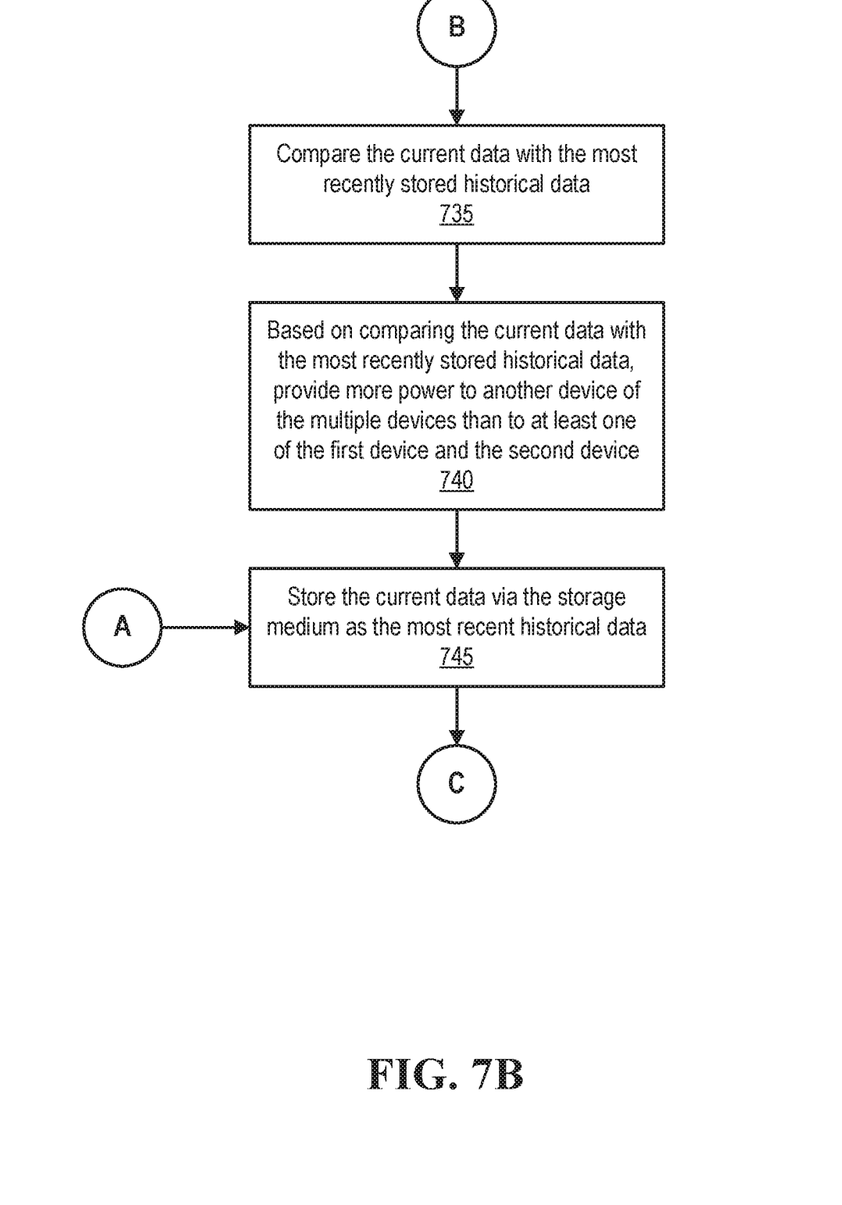

Turning now to FIGS. 7A and 7B, an exemplary method of operating a wireless charging system is illustrated, according to one or more embodiments. At 710, a wireless charging hub may supply, via a multiple of wireless charging endpoints, more power to a first device of the multiple devices than to a second device of the multiple devices. For example, WCH 210 may supply, via multiple of WCEPs 220, more power to a first device of the multiple devices than to a second device of the multiple devices. For instance, WCH 210 may supply more power to device 230C than device 230E via respective WCEPs 220C and 220E.

At 715, current data, from each of the multiple devices, that includes a current charge capacity of each of the multiple devices and a current discharge rate of each of the multiple devices may be received. For example, WCH 210 may receive current data that includes a current charge of each device 230 and a current discharge rate of each device 230. In one instance, WCH 210 may receive the current data via a Qi protocol. In another instance, WCH 210 may receive the current data via a Bluetooth protocol. In one or more embodiments, the data, from each of the multiple devices, that includes the charge capacity of each of the multiple devices and the discharge rate of each of the multiple devices may further include one or more of a cut-off voltage of each of the multiple devices and a charge voltage of each of multiple devices. For example, WCH 210 may receive current data that includes one or more of a cut-off voltage of each device 230 and a charge voltage of each device 230.

At 720, it may be determined if historical data of each of the multiple devices is available via a storage medium. For example, WCH 210 may determine if historical data of each of the multiple devices is available via a storage medium (e.g., a memory medium, a storage device, etc.). For instance, WCH 210 may determine if historical data of each of device 230 is available via at least one of memory media 150 and 160, among others. In one or more embodiments, the historical data of each of the multiple devices may include one or more attributes of the current data. For example, the historical data may include one or more of a charge capacity, a discharge rate, a cut-off voltage, and a charge voltage, among others, of one or more devices 230.

In one or more embodiments, determining if historical data of each of the multiple devices is available via a storage medium may include determining if the historical data of each of the multiple devices is available via a storage medium via a network. For example, WCH 210 may access a storage medium via a network. In one instance, WCH 210 may access an information handling system, via a network, that includes or is coupled to the storage medium. In another instance, WCH 210 may access a database, via a network, that includes or is coupled to the storage medium.

If the historical data, of each of the multiple devices, is not available via the storage medium, supplying more power to the first device of the multiple devices than to the second device of the multiple devices, via the multiple wireless charging endpoints, may be continued at 725. In one or more embodiments, the method may proceed to 745. If the historical data, of each of the multiple devices, is available via the storage medium, most recently stored historical data, that includes a most recently stored charge capacity of each of the multiple devices and a most recently stored discharge rate of each of the multiple devices, may be received from the storage medium at 730. In one or more embodiments, the historical data may be received via a network.

At 735, the current data and the most recently stored historical data may be compared. For example, WCH 210 may compare the current data and the most recently stored data. At 740, based on comparing the current data and the most recently stored historical data, more power may be supplied to another device of the multiple devices than to at least one of the first device of the multiple devices and the second device of the multiple devices. For example, WCH 210 may supply more power to another device of devices 230 than to at least one of device 230C and device 230E. For instance, WCH 210 may supply more power to device 230G of devices 230 than to at least one of device 230C and device 230E. In one or more embodiments, the other device of the multiple devices may be the second device of the multiple devices. For example, WCH 210 may supply more power to device 230E than device 230C via respective WCEPs 220E and 220C.

At 745, the current data may be stored, via the storage medium, as the most recently historical data. In one example, the current data may be stored, via the storage medium, in addition to the most recently historical data. In another example, the current data may be stored, via the storage medium, as a replacement of the most recently historical data. In one or more embodiments, the method may proceed to 715.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A wireless charging system, comprising:
a wireless charging hub that includes a processor and a memory medium that is communicatively coupled to the processor and that includes instructions executable by the processor;
wherein when the processor executes the instructions, the wireless charging hub:
supplies, via a plurality of wireless charging endpoints wirelessly coupled to the wireless charging hub, more power to a first device of a plurality of devices than to a second device of the plurality of devices; and
while the plurality of devices are wirelessly coupled to the plurality of wireless charging endpoints, the wireless charging hub:
receives current data, from each of the plurality of devices, that includes a current charge capacity of each of the plurality of devices and a current discharge rate of each of the plurality of devices;
determines if historical data of each of the plurality of devices is available via a storage medium;
if the historical data of each of the plurality of devices is available via the storage medium:
receives most recently stored historical data, from the storage medium, that includes a most recently stored charge capacity of each of the plurality of devices and a most recently stored discharge rate of each of the plurality of devices;
compares the current data with the most recently stored historical data; and
based on comparing the current data with the most recently stored historical data, supplies more power to another device of the plurality of devices than to at least one of the first device and the second device; and
if the historical data, from each of the plurality of devices, is not available via the storage medium:
continues supplying, via the plurality of wireless charging endpoints, more power to the first device of the plurality of devices than to the second device of the plurality of devices; and
stores the current data via the storage medium as the most recent historical data.

2. The wireless charging system of claim 1,
wherein the other device is the second device; and
wherein when the wireless charging hub supplies more power to the other device of the plurality of devices than to the at least one of the first device and the second device, the wireless charging hub supplies more power to the second device than to the first device.

3. The wireless charging system of claim 1, wherein the wireless charging hub further:
detects a third device wirelessly coupled to a wireless charging endpoint of the plurality of wireless charging endpoints that does not provide any data; and supplies less power to the third device, that does not provide any data, than to the plurality of devices that provided the current data.

4. The wireless charging system of claim 1, wherein the plurality of devices includes at least one of a wireless telephone, a tablet computing device, a laptop computing device, a rechargeable battery, a wireless battery charger, a wireless keyboard, and a wireless pointing device.

5. The wireless charging system of claim 1, wherein the current data, from each of the plurality of devices, that includes the current charge capacity of each of the plurality of devices and the current discharge rate of each of the plurality of devices further includes a current cut-off voltage of each of the plurality of devices and a current charge voltage of each of the plurality of devices.

6. The wireless charging system of claim 1, wherein when the wireless charging hub receives the current data, from each of the plurality of devices, that includes the current charge capacity of each of the plurality of devices and the current discharge rate of each of the plurality of devices, the wireless charging system receives the current data via at least one of a Qi protocol and a Bluetooth protocol.

7. The wireless charging system of claim 1, wherein when the wireless charging hub determines if historical data of each of the plurality of devices is available via the storage medium, the wireless charging hub determines if historical data of each of the plurality of devices is available via the storage medium via a network.

8. The wireless charging system of claim 1, wherein wireless charging hub further:
receives a priority associated with a third device of the plurality of devices; and
based on the priority, supplies more power to the third device than to at least one of the first device, the second device, and the other device.

9. The wireless charging system of claim 1, further comprising:
the plurality of wireless charging endpoints.

10. The wireless charging system of claim 1, wherein the wireless charging hub further:
determines that the first device has reached a limit of charging capacity; and
discontinues supplying power to the first device.

11. A method, comprising:
a wireless charging hub of a wireless charging system supplying, via a plurality of wireless charging endpoints, more power to a first device of a plurality of devices than to a second device of the plurality of devices; and
while the plurality of devices are wirelessly coupled to the plurality of wireless charging endpoints:
the wireless charging hub receiving current data, from each of the plurality of devices, that includes a current charge capacity of each of the plurality of devices and a current discharge rate of each of the plurality of devices;
the wireless charging hub determining if historical data of each of the plurality of devices is available via a storage medium;
if the historical data of each of the plurality of devices is available via the storage medium:
the wireless charging hub receiving most recently stored historical data, from the storage medium, that includes a most recently stored charge capacity of each of the plurality of devices and a most recently stored discharge rate of each of the plurality of devices;
the wireless charging hub comparing the current data with the most recently stored historical data; and
based on the wireless charging hub comparing the current data with the most recently stored historical data, the wireless charging hub supplying more power to another device of the plurality of devices than to at least one of the first device and the second device; and
if the historical data, from each of the plurality of devices, is not available via the storage medium:
the wireless charging hub continuing the supplying, via the plurality of wireless charging endpoints, more power to the first device of the plurality of devices than to the second device of the plurality of devices; and
the wireless charging hub storing the current data via the storage medium as the most recent historical data.

12. The method of claim 11,
wherein the other device is the second device; and
wherein the wireless charging hub supplying more power to the other device of the plurality of devices than to the at least one of the first device and the second device includes the wireless charging hub supplying more power to the second device than to the first device.

13. The method of claim 11, further comprising:
the wireless charging hub detecting a device coupled to a wireless charging endpoint of the plurality of wireless charging endpoints that does not provide any data; and
the wireless charging hub supplying less power to the device that does not provide any data than to the plurality of devices that provided the current data.

14. The method of claim 11, wherein the plurality of devices includes at least one of a wireless telephone, a tablet computing device, a laptop computing device, a rechargeable battery, a wireless battery charger, a wireless keyboard, and a wireless pointing device.

15. The method of claim 11, wherein the current data, from each of the plurality of devices, that includes the current charge capacity of each of the plurality of devices and the current discharge rate of each of the plurality of devices further includes a current cut-off voltage of each of the plurality of devices and a current charge voltage of each of the plurality of devices.

16. The method of claim 11, wherein the wireless charging hub receiving the current data, from each of the plurality of devices, that includes the current charge capacity of each of the plurality of devices and the current discharge rate of each of the plurality of devices includes the wireless charging hub receiving the current data via at least one of a Qi protocol and a Bluetooth protocol.

17. The method of claim 11, wherein the wireless charging hub determining if historical data of each of the plurality of devices is available via the storage medium includes the wireless charging hub determining if historical data of each of the plurality of devices is available via the storage medium via a network.

18. The method of claim 11, further comprising:
the wireless charging hub receiving a priority associated with a third device of the plurality of devices; and
based on the priority, the wireless charging hub supplying more power to the third device than to at least one of the first device, the second device, and the other device.

19. The method of claim 18, wherein the wireless charging hub supplying more power to the third device of the plurality of devices than to the at least one of the first device, the second device, and the other device includes the wireless charging hub supplying more power to the third device of the plurality of devices than each of the first device, the second device, and the other device.

20. The method of claim 11, further comprising:
the wireless charging hub determining that the first device has reached a limit of charging capacity; and
the wireless charging hub discontinuing supplying power to the first device.

* * * * *